P. KRUMSCHEID.
BEER PUMP.
No. 180,600. Patented Aug. 1, 1876.
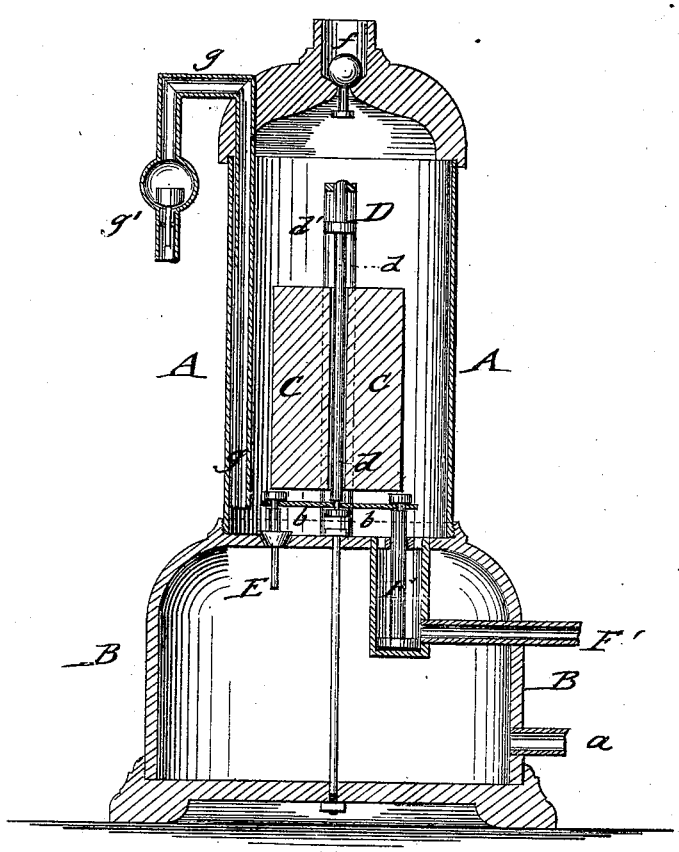

UNITED STATES PATENT OFFICE.

PHILIP KRUMSCHEID, OF BOSTON, MASSACHUSETTS, ASSIGNOR TO HIMSELF, J. KRUMSCHEID, AND JOHN R. FOLEY, OF SAME PLACE.

IMPROVEMENT IN BEER-PUMPS.

Specification forming part of Letters Patent No. 180,600, dated August 1, 1876; application filed June 6, 1876.

*To all whom it may concern:*

Be it known that I, PHILIP KRUMSCHEID, of Boston, in the county of Suffolk and State of Massachusetts, have invented a new and Improved Beer-Pump, of which the following is a specification:

The accompanying drawing represents a a vertical central section of my improved beer-pump.

The invention relates to that class of wine and beer pumps that are operated by water-pressure, so as to keep a uniform pressure of air in the barrel and produce an automatic working of the pump.

The invention consists of a beer-pump in which a float shuts, when raised to a certain height, the water-supply, and draws off a certain quantity of water, sufficient to lower the float and re-establish the water-supply. The air is forced through and retained in the barrel by a check-valve, and drawn into the pump through an air-pipe with check-valve, on the falling of the water-level.

In the drawing, A represents a beer-pump that is divided by a horizontal partition into two chambers, the upper, A, for forcing the air into the barrel by the rising of the water in the same, the lower chamber B B for collecting the water for being more readily and uniformly discharged through an exit-pipe.

The water is supplied to the upper chamber of the pump through a bottom valve, F, and entrance-pipe F', while a second bottom valve, E, of the upper chamber A, serves to draw off the water into the lower chamber B, to conduct it off through a bottom pipe, *a*. The stems of valves E and F are hung to a plate, arms, or other support, *b*, which is applied to a vertical central rod, *d*, that is guided at its upper end in a perforated diametrical support, *e*, near the top of the upper chamber. A float, C, of any suitable material, slides along the central rod *d*, and is raised by the increasing quantity of water entering through the bottom valve, until it comes in contact with a collar, *d'*, of rod *d*, and lifts thereby the rod in conjunction with the valves E and F, producing the closing of valve F and the interruption of the water-supply, and the opening of valve E, and thereby the discharge of water from the upper chamber of the pump. The float sinks with the water-level until it strikes the plate or support *b*, and re-establishes, thereby, the opening of valve F and closing of valve E, so that the water enters again into chamber A and raises the float as before. The air in the top part of the upper chamber is compressed by the rising of the water-level, and forced through a check-valve, *f*, at the top of the pump, and a connecting-pipe, into the beer, ale, or other barrel, and retained in the same by the action of valve, *f*, when the water-level is reduced by the opening of exit-valve E.

An air-pipe, *g*, extends from a point near the bottom of the upper chamber A to the top of the same, to the outside, being closed at the outer end by a check-valve, *g'*, which is called into action the instant when the water-level is lowered, as the partial vacuum formed in the upper part draws in the air and causes the same to pass up through the water, so as to be purified before it is forced into the barrel. The supply of air is interrupted as soon as the water begins to rise again in the chamber, the valves *f* and *g'* being called alternately into action, respectively, for the egress and ingress of air, in connection with the action of the water-supply and discharge pipes F and E.

The working of the pump is thus continuously kept up by the opening and closing of the valves and the automatic action of the float, and regulated by the pressure required for the barrel.

Having thus described my invention, I claim as new and desire to secure by Letters Patent—

In a beer-pump, having air entrance and exit pipes and check-valves, the combination of water supply and discharge valves F and E, at the bottom of the air-chamber A, by a valve-connecting plate or support, *b*, a vertical rod, *d*, and collar, *d'*, with the float C, to interrupt and re-establish the water-supply and the action of the pump, substantially in the manner and for the purpose set forth.

PHILIP KRUMSCHEID.

Witnesses:
JOSEPH TILMANN,
JOSEPH PREISERF.